(12) United States Patent
Ogihara (10) Patent No.: US 6,222,671 B1
(45) Date of Patent: *Apr. 24, 2001

(54) OPTICAL ELEMENT SWITCHING DEVICE

(75) Inventor: Yasushi Ogihara, Yokohama (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,906

(22) Filed: Nov. 12, 1997

(30) Foreign Application Priority Data

Nov. 12, 1996 (JP) ................................... 8-315411
Mar. 11, 1997 (JP) ................................... 9-074407

(51) Int. Cl.⁷ ........................... G02B 21/06; G02B 21/00
(52) U.S. Cl. ..................... 359/390; 359/368; 359/385; 359/389
(58) Field of Search ........................ 359/368, 819, 359/379–390, 821, 694–706

(56) References Cited

U.S. PATENT DOCUMENTS

| | | | |
|---|---|---|---|
| 4,407,569 | * 10/1983 | Piller et al. | 359/388 |
| 4,487,486 | * 12/1984 | Hayasaka | 359/390 |
| 4,753,525 | * 6/1988 | Gaul et al. | 359/390 |
| 5,633,752 | * 5/1997 | Tsuchiya et al. | 359/389 |
| 5,684,624 | * 11/1997 | Wieber et al. | 359/381 |
| 5,777,783 | * 7/1998 | Endou et al. | 359/385 |

FOREIGN PATENT DOCUMENTS

2055944 * 5/1972 (DE) ................................... 359/388

* cited by examiner

*Primary Examiner*—Thong Nguyen
(74) *Attorney, Agent, or Firm*—Finnegan, Henderson, Farabow, Garrett & Dunner, L.L.P.

(57) ABSTRACT

An optical element switching device capable of quickly and reliably switching among optical elements. The optical element switching device includes a fixed guide section mounted on a housing, and a movable guide section mounted movably relative to the fixed guide section and provided with more than three optical elements. By moving the movable guide section, one of the optical elements is selectively inserted into the optical path. The optical element switching device further includes a restricting mechanism for limiting the number of optical elements which can be inserted into the optical path by restricting the movement of the movable guide section.

4 Claims, 10 Drawing Sheets

OPTICAL ELEMENT SWITCHING DEVICE

BACKGROUND OF THE INVENTION

1. Field of the Invention

The present invention relates to an optical element switching device suited for use in a microscope.

2. Description of the Related Art

A well-known type of optical element switching device includes a fixed guide section located in a housing and a movable guide section which is located movably relative to the fixed guide section and provided with a plurality of optical elements. In such an optical element switching device, the movable guide section moves along the fixed guide section so that any of optical elements can be inserted into the optical path.

Although at most, two optical elements were used in conventional microscopic examinations, new examination methods have recently been developed, and the number of optical elements to be used has increased to more than three.

Furthermore, these methods are now used in routine examinations, and therefore, it is necessary to quickly select a desired optical element from many optical elements. However, such quick selection sometimes leads to erroneous selection of an undesired optical element.

SUMMARY OF THE INVENTION

An object of the present invention, in view of the above problem, is to provide an optical element switching device capable of switching optical elements quickly and reliably.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

According to one aspect of the present invention, an optical element switching device is provided for alternatively placing a plurality of optical elements in the optical path of an optical instrument. The device comprises a movable member for holding the plurality of optical elements, a fixed member for holding the movable member movably, and a restricting device for limiting the number of optical elements to be placed in the optical path by restricting the moving range of the movable member.

Since the moving range of the movable member can be restricted by the restricting device, it is possible to select only a desired optical element from a plurality of optical elements mounted on the movable member.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
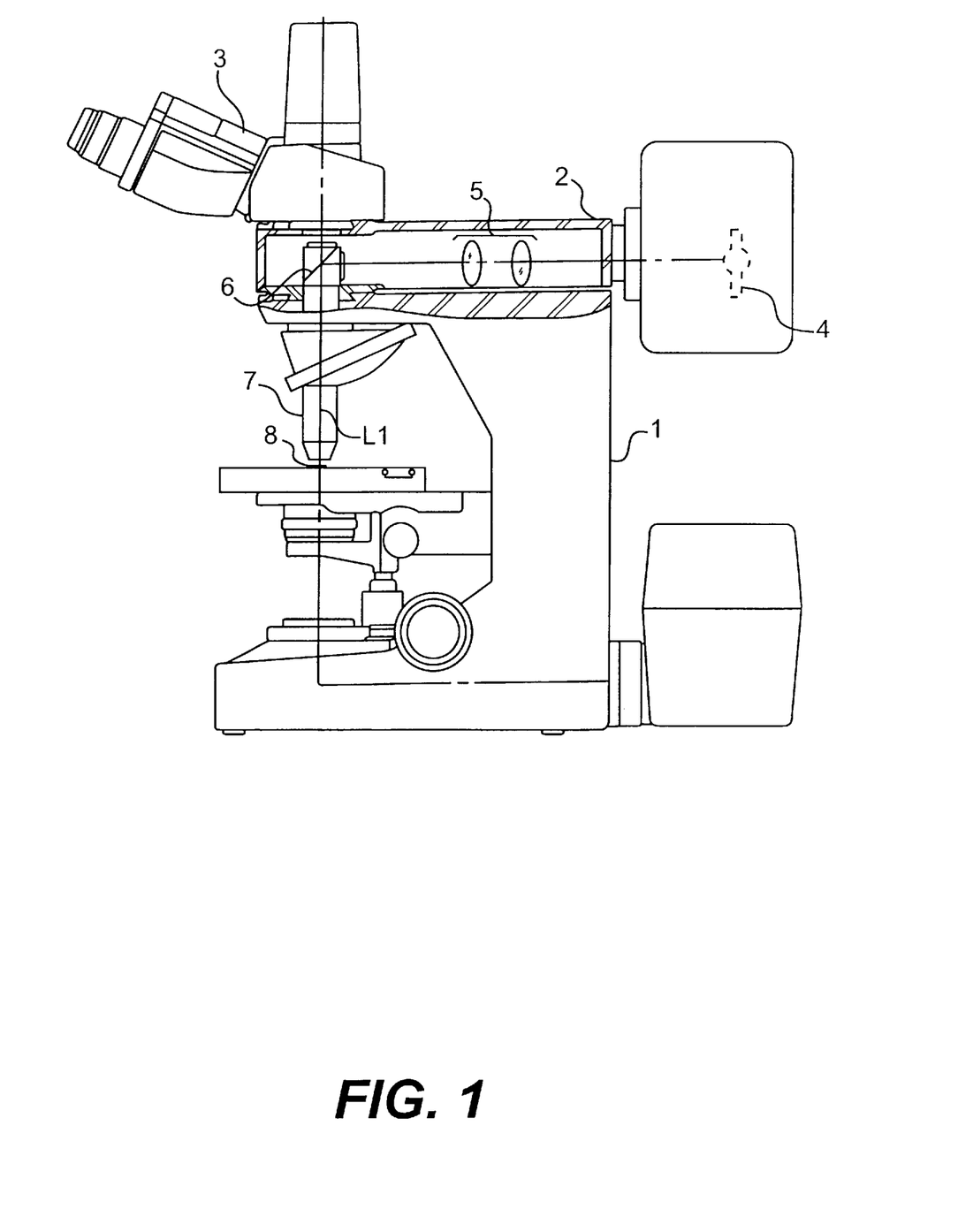
FIG. 1 is a side view of a microscope according to the present invention.

As shown in FIG. 1, an epi-fluorescence illuminator 2 is mounted at the top of a microscope body 1. A viewing tube 3 is mounted on the epi-illuminator 2. Light from a light source 4 of the epi-fluorescence illuminator 2 is radiated onto a dichroic mirror 6 through a relay optical system 5. A plurality of the dichroic mirrors 6 are mounted in the illuminator 2 and alternatively placed in the optical path of the microscope. Specifically, the dichroic mirrors 6 are placed on an optical axis L1 of an objective lens 7. Each of the dichroic mirrors 6 are different in type, and one or a plurality of dichroic mirrors best-suited for viewing are selected. Each dichroic mirror 6 reflects light with wavelengths in a predetermined region from the light source 4, and radiates the light onto a specimen 8, as excitation light, through the objective lens 7.

Fluorescence from the specimen 8 enters the dichroic mirror 6 through the objective lens 7, and the dichroic mirror 6 transmits and directs the fluorescence to the viewing tube 3.

The illuminator 2 is provided with a switching device for switching a plurality of dichroic mirrors 6. A switching mechanism of the switching device will be described specifically below in connection with a plurality of embodiments of the present invention.

Figure 2:
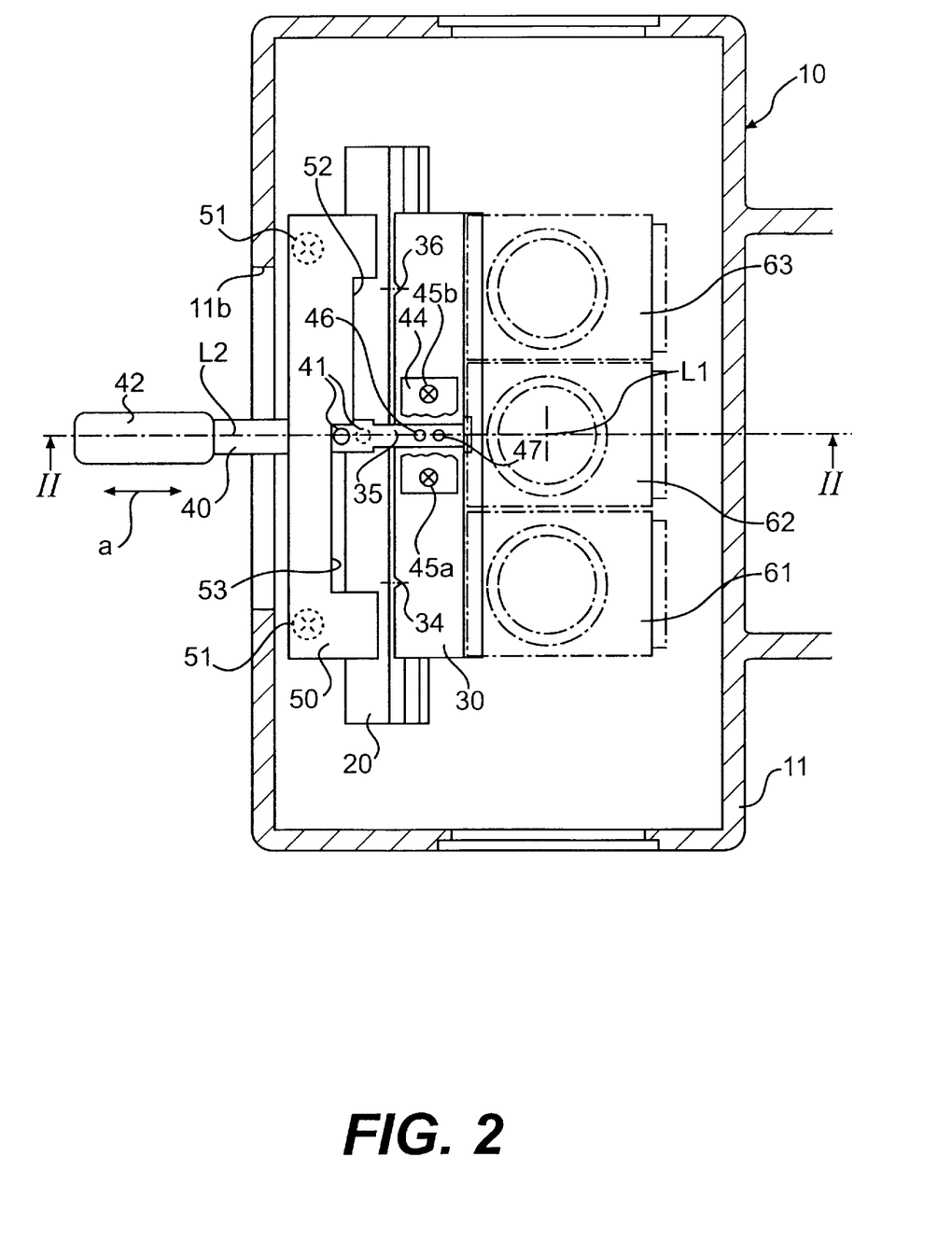
FIG. 2 is a transverse sectional view of an optical element switching device according to a first embodiment of the present invention.
Figure 3:
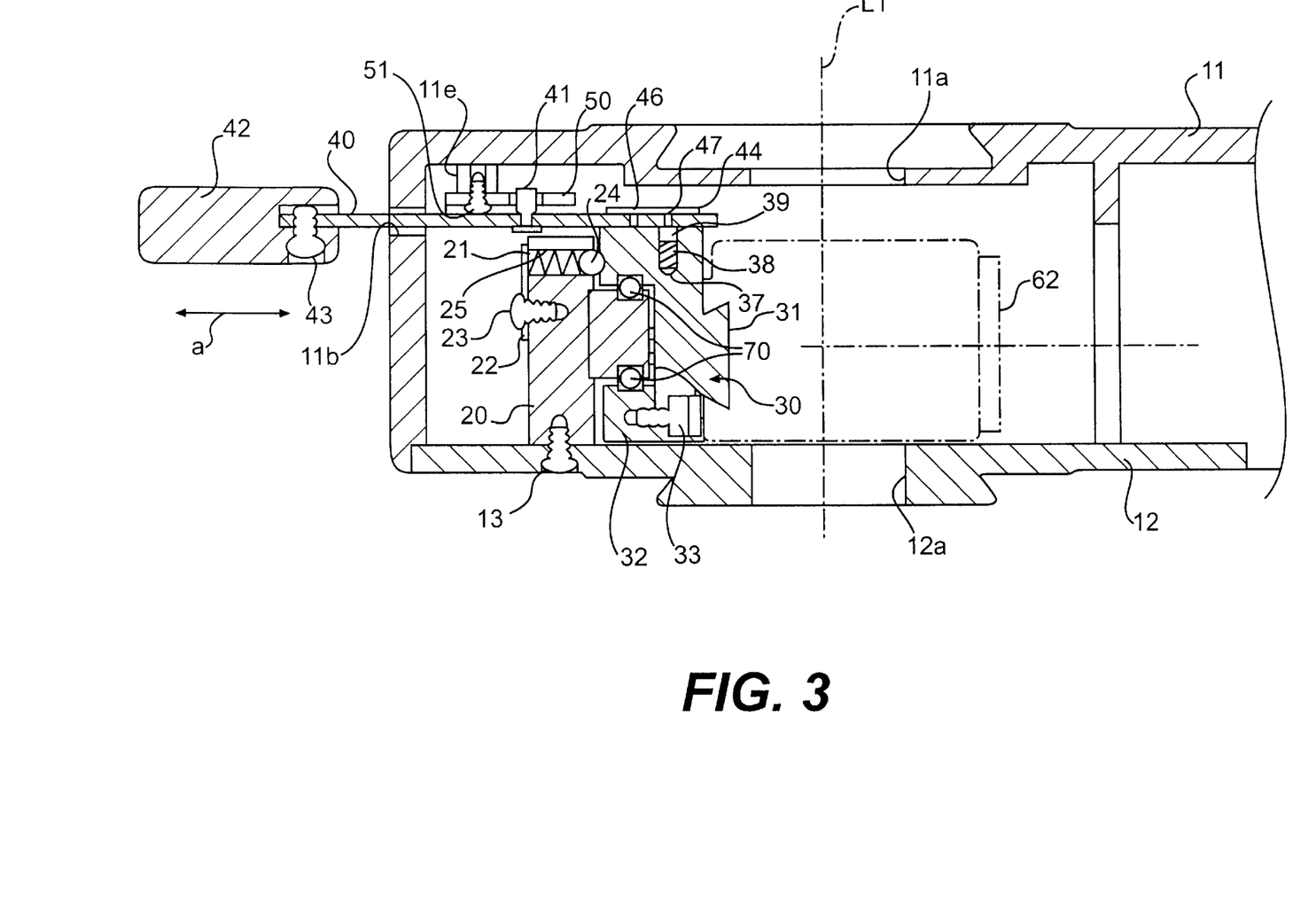
FIG. 3 is a cross-sectional view taken along the line II—II of FIG. 2.

FIG. 2 is a transverse sectional view of an optical element switching device according to a first embodiment of the present invention, and FIG. 3 is a cross-sectional view taken along the line II—II of FIG. 2.

The optical element switching device comprises a housing 10, a fixed guide section 20, a movable guide section 30, a control lever (control section) 40, a restricting pin 41, and a restricting plate (restricting member) 50.

The housing 10 comprises an upper housing 11 and a lower housing 12. Contained in a closed space defined by the upper housing 11 and the lower housing 12 are the fixed guide section 20, the movable guide section 30, the control lever 40, the restricting pin 41, and the restricting plate 50.

The upper housing 11 and the lower housing 12 are respectively provided with openings 11a and 12a positioned on an optical axis L1, which extends in the vertical direction of FIG. 3.

The fixed guide section 20 is fixed on the lower housing 12 by a screw 13. The top of the fixed guide section 20 has a through hole 21 extending toward the movable guide section 30. One end of the through hole 21 is sealed by a retaining plate 22, which is fixed on the side of the fixed guide section 20 by a screw 23.

A steel ball 24 is mounted at the other end of the through hole 21. The steel ball 24 is forced toward the movable guide section 30 by a spring 25 held in the through hole 21, and the steel ball 24 is in contact with the side wall of an upper movable guide section 31, which will be described later, with a certain pressure.

The movable guide section 30 and the fixed guide section 20 are connected to each other through a ball race mechanism for supporting a plurality of balls 70 rollably, and the movable guide section 30 is movable with respect to the fixed guide section 20. Attached to the side of the movable guide section 30 opposite to the fixed guide section 20 are optical elements 61 to 63, such as mirrors or lenses.

The movable guide section 30 includes an upper movable guide section 31 and a lower movable guide section 32, and the lower movable guide section 32 is fixed to the upper movable guide section 31 by a screw 33.

V-grooves 34 to 36 capable of engaging with the steel ball 24 are formed on the side of the upper movable guide section 31 and at positions corresponding to the optical elements 61 to 63.

Furthermore, a small hole 37 is formed at the top of the upper movable guide section 31 in parallel with the optical path L1. A spring 38 and a steel ball 39 are mounted in the small hole 37, and the steel ball 39 is biased toward the control lever 40 by the elastic force of the spring 38.

One end of the control lever 40 extends outside the housing 10 through a slit 11b formed on the side of the upper housing 11, and is provided with a control knob 42 attached thereto by a screw 43.

The other end of the control lever 40 is supported by a fixing member 44 so that the control lever 40 can move in the direction shown by the arrow a in FIGS. 2 and 3. The fixing member 44 is attached to the movable guide section 30 by screws 45a and 45b.

Moreover, at the other end of the control lever 40, small holes 46 and 47, which have a slightly smaller diameter than that of the steel ball 39, are formed at a certain interval on an axis L2 serving as the center axis of the control lever 40. Therefore, when the control lever 40 is moved along the axis L2, the steel ball 39 is fitted in the small hole 46 or 47, whereby the control lever 40 is allowed to be positioned at two points.

The restricting pin 41 is located in the center of the control lever 40 and on the axis L2. The positional relationship between the restricting pin 41 and the small holes 46 and 47 is shown in FIG. 2. The restricting pin 41 is moved between a position shown by the dotted line and a position shown by the solid line by pulling the control lever 40 in and out.

The restricting plate 50 is fixed to a projection 11e of the upper housing 11 by screws 51, and provided with a rectangular cutout 52 having a length corresponding to the center distance between the optical elements 61 and 63.

Furthermore, a rectangular cutout 53 having a length corresponding to the center distance between the two optical elements 61 and 62 is formed in a part of the cutout 52.

The control lever 40, the control knob 42, the restricting pin 41, the restricting plate 50, the fixing member 44, the steel ball 39 and the spring 38 constitute a restricting mechanism. Although the restricting plate 50 is fixed on the housing 11 by the screws 51 in this embodiment, it may be formed integrally with the housing 11.

Furthermore, the small holes 46 and 47 and the restricting pin 41 may be offset from the axis L2. In this case, the mounting position of the control lever 40 relative to the movable guide section 30 or the mounting position of the restricting plate 50 relative to the upper housing 11 is correspondingly offset.

The operation of the optical element switching device having the above-mentioned structure will be described below.

When the steel ball 39 is fitted into the small hole 46 by pushing the control lever 40 in, since the restricting pin 41 reaches the position shown by the dotted line, the movable guide section 30 is allowed to move within the cutout 52.

Therefore, it is possible to engage any of the V-grooves 34 to 36 of the movable guide section 30 with the steel ball 24 by handling the control knob 42, and to place any of the three optical elements 61 to 63 in the optical path L1.

On the other hand, when the steel ball 39 is fitted into the small hole 47 by pulling the control lever 40 out, as shown in FIG. 2, since the restricting pin 41 moves to the position shown by the solid line, the movable guide section 30 is allowed to move only within the cutout 53.

Therefore, it is possible to engage the V-groove 35 or 36 of the movable guide section 30 with the steel ball 24 by handling the control knob 42, and to place either one of the two optical elements 62 and 63 in the optical path L1.

According to the first embodiment, when only two optical elements 62 and 63 are frequently used, it is possible to quickly select a desired optical element because the optical elements to be inserted into the optical path L1 can be limited to the two optical elements 62 and 63 by pulling the control lever 40 out.

Furthermore, when using the optical element 61, which is not used frequently, any of the three optical elements 61 to 63 is allowed to be selected by pushing the control lever 40 in; therefore, erroneous selection of the optical element is avoided.

Figure 4:
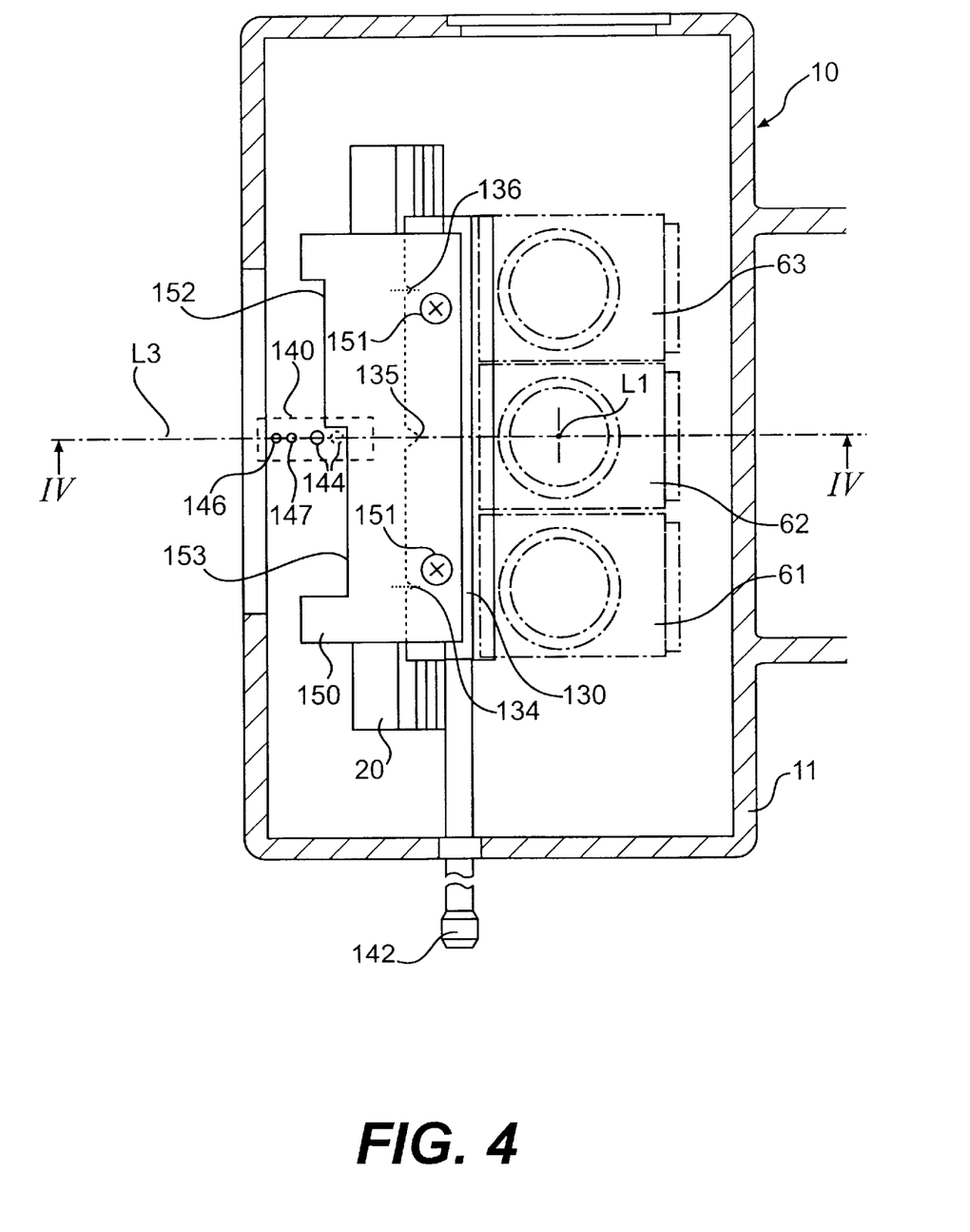
FIG. 4 is a transverse sectional view of an optical element switching device according to a second embodiment of the present invention.
Figure 5:
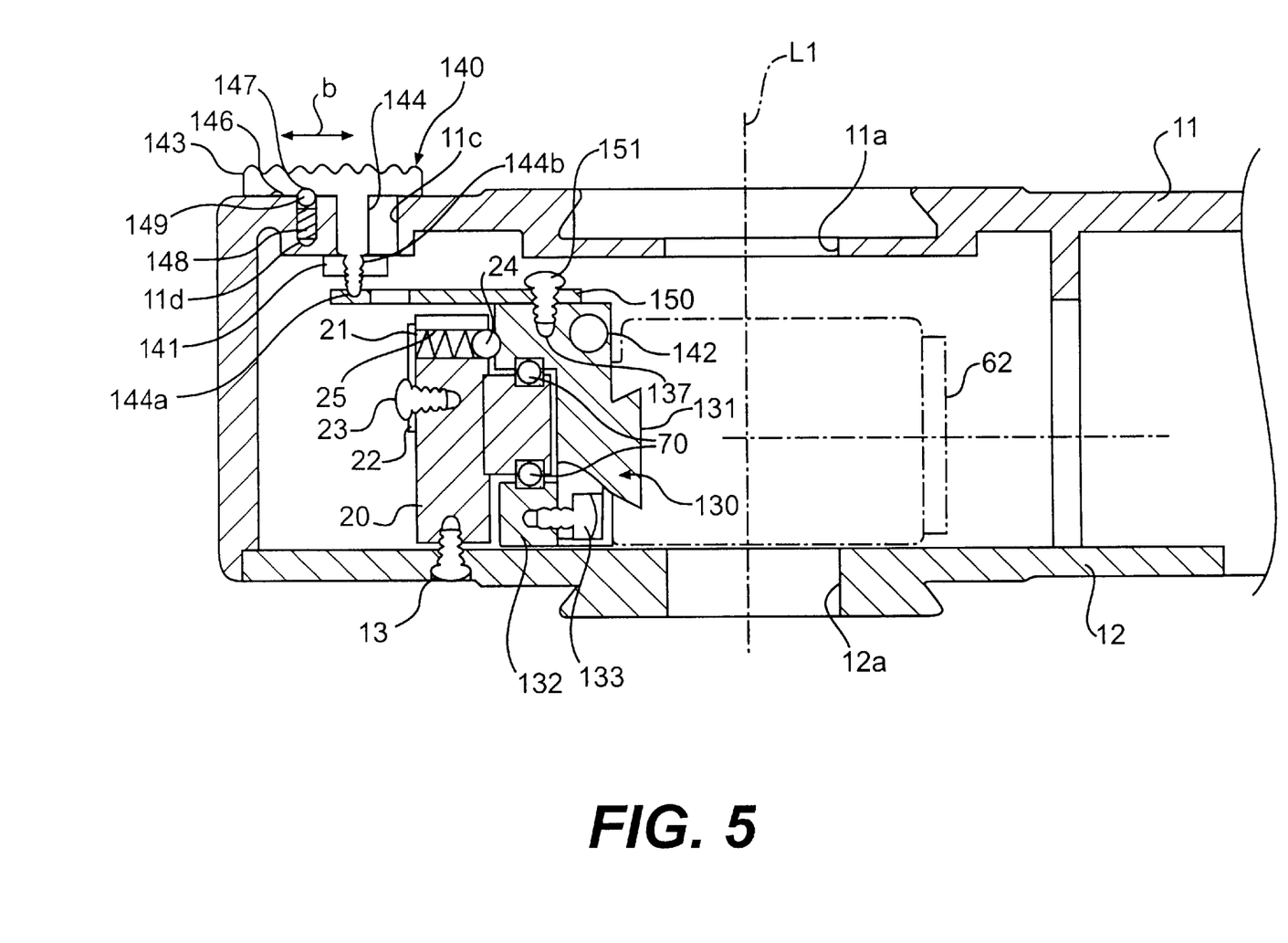
FIG. 5 is a cross-sectional view taken along the line IV—IV of FIG. 4.

FIG. 4 is a transverse sectional view of an optical element switching device according to a second embodiment of the present invention, and FIG. 5 is a cross-sectional view taken along the line IV—IV in FIG. 4. The same components as in the first embodiment are designated by the same numerals, and the description thereof is omitted.

The optical element switching device comprises a housing 10, a fixed guide section 20, a movable guide section 130, a control switch (control section) 140, and a restricting plate (restricting member) 150.

Contained in a closed space defined by an upper housing 11 and a lower housing 12 are the fixed guide section 20, the movable guide section 130, and the restricting plate 150.

The movable guide section 130 and the fixed guide section 20 are connected to each other through a ball race mechanism which supports a plurality of balls 70 rollably. The movable guide section 130 is provided with a control bar 142 which extends outside the housing 10, and the movable guide section 130 can be moved by operating the control bar 142. The movable guide section 130 is also provided with optical elements 61 to 63, such as mirrors or lenses, to be placed in an optical path L1.

The movable guide section 130 has an upper movable guide section 131 and a lower movable guide section 132. The lower movable guide section 132 is fixed to the upper movable guide section 131 by a screw 133.

The upper movable guide section 131 has, on its side, V-grooves 134 to 136 capable of engaging with a steel ball 24. The V-grooves 134 to 136 and are formed at positions corresponding to the optical elements 61 to 63.

A female thread 137 is formed on the top of the upper movable guide section 131. One end of the restricting plate 150 is fixed on the upper surface of the upper movable guide section 130 by screws 151. Formed at the other end of the restricting plate 150 is a rectangular cutout 152 having a length corresponding to the center distance between the optical elements 61 and 63. Furthermore, a rectangular cutout 153 having a length corresponding to the center distance between the optical elements 61 and 62 is formed in a part of the cutout 152.

The control switch 140 includes a horizontal section 143, which is slidable on the upper housing 11 in the direction of an axis L3, and a hanging section (restricting pin) 144 extending from the lower surface of the horizontal section 143. The axis L3 is the center axis of the control switch 140.

Parallel knurls are formed on the upper surface of the horizontal section 143 orthogonal to the sliding direction thereof, and two V-grooves 146 and 147 are formed at a certain interval along the axis L3 on the lower surface of the horizontal section 143.

The hanging section 144 is inserted into the housing 10 through a groove 11c, which is formed on the upper surface of the upper housing 11, and has a length corresponding to the distance between the V-grooves 146 and 147. A leading section 144a of the hanging section 144 reaches a position where it is able to engage with the restricting plate 150. Formed at the bottom of the hanging section 144 is a male thread 144b, with which a female thread 141 is engaged so that the control switch 140 is prevented from coming off the housing 10.

On the upper surface of the upper housing 11, a small hole 11d is formed on the axis L3, and a spring 148 and a steel ball 149 are mounted therein. The steel ball 149 is pressed against the lower surface of the control switch 140 by the elastic force of the spring 148. Therefore, the steel ball 149 can be engaged with the V-groove 146 or 147 when the control switch 140 is moved on the axis L3 in the direction shown by the arrow b, which makes it possible to position the control switch 140 at two points and to place the hanging section 144 into either one of the cutouts 152 and 153.

The control switch 140, the restricting plate 150, the steel ball 149 and the spring 148 constitute a restricting mechanism. Although the restricting plate 150 is fixed on the movable guide section 130 by the screws 151 in this embodiment, it may be integrally formed with the movable guide section 130.

The optical element switching device having the above-mentioned structure operates as follows.

When the hanging section 144 is moved to the position shown by the dotted line by sliding the control switch 140, the movable guide 130 is allowed to move within the cutout 153. Therefore, it is possible to engage the V-grooves 134 and 135 of the movable guide section 130 with the steel ball 24, and to place the two optical elements 61 and 62 in the optical path L1.

On the other hand, since the hanging section 144 moves to the position shown by the solid line when the control switch 140 is pulled out, the movable guide section 130 is allowed by the control bar 142 to move within the cutout 152. Therefore, it is possible to place any of the three optical elements 61 to 63 in the optical path L1, and to engage any of the V-grooves 134 to 136 of the movable guide section 130 with the steel ball 24. The second embodiment has the same advantages as the first embodiment.

Figure 6:
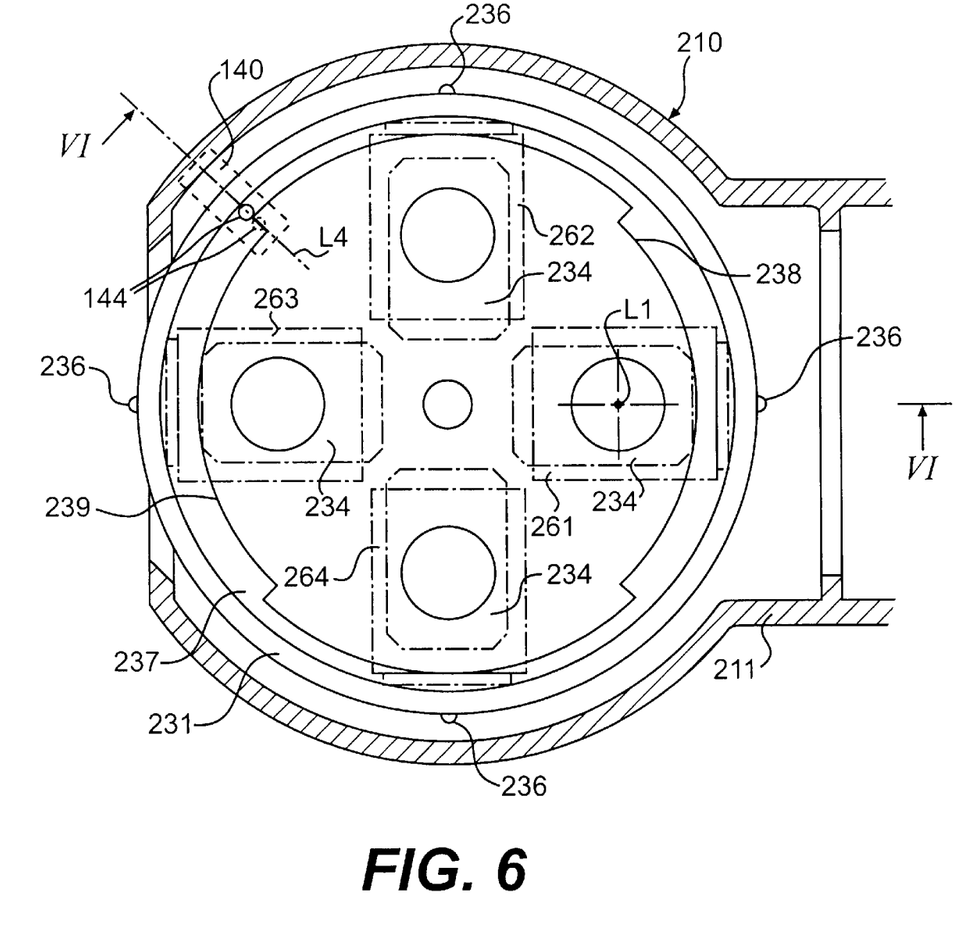
FIG. 6 is a transverse sectional view of an optical element switching device according to a third embodiment of the present invention.
Figure 7:
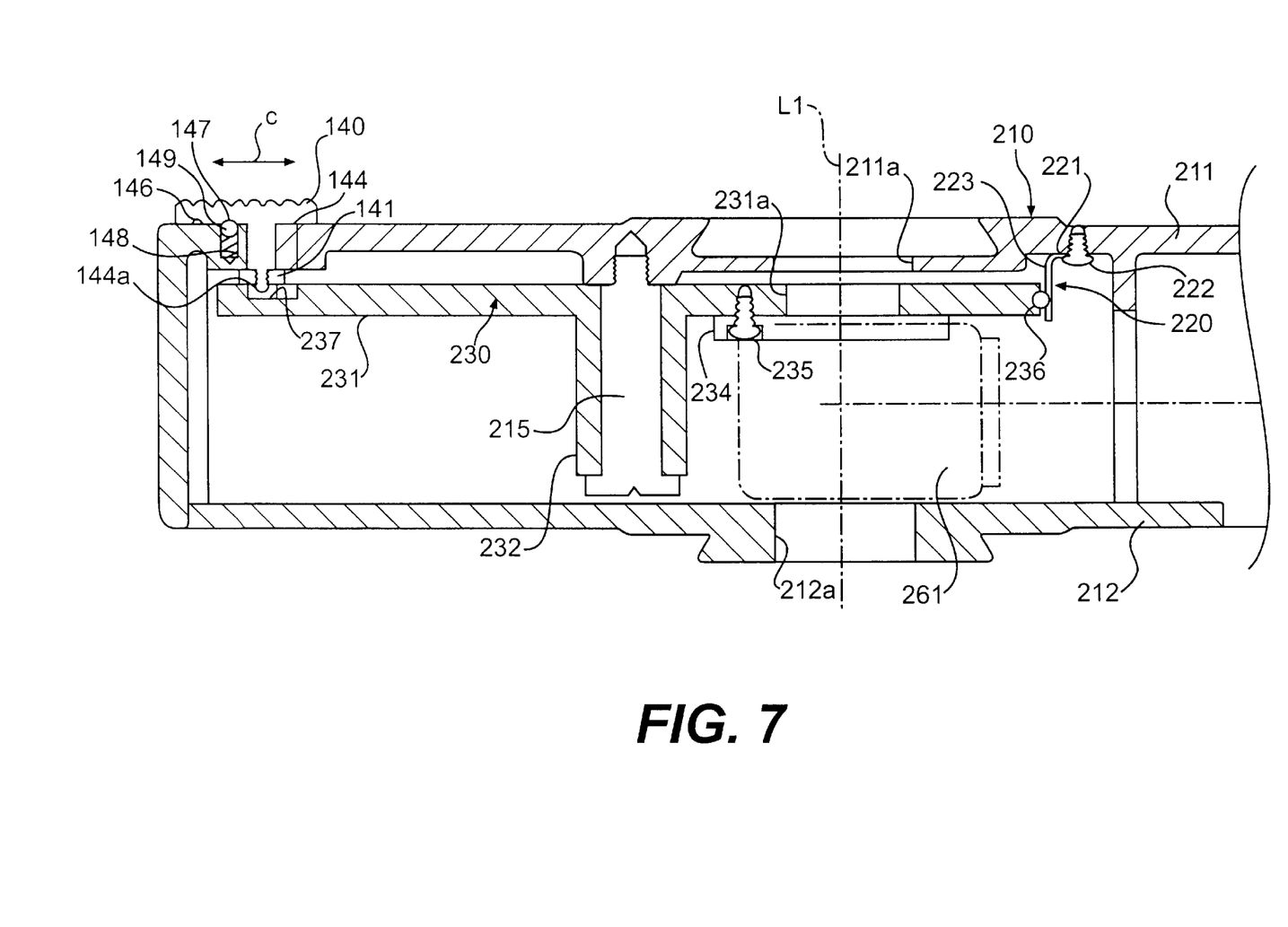
FIG. 7 is a cross-sectional view taken along the line VI—VI of FIG. 6.

FIG. 6 is a transverse sectional view of an optical element switching device according to a third embodiment of the present invention, and FIG. 7 is a sectional view taken along the line VI—VI in FIG. 6. The same components as those in the second embodiment are designated by the same numerals, and the description thereof is omitted.

The optical element switching device comprises a housing 210, a leaf spring (fixed guide section) 220, a rotary turret 230, and a control switch (control section) 140. The housing 210 has an upper housing 211 and a lower housing 212, and has an almost circular shape when viewed in plan. A closed space, defined by the upper housing 211 and the lower housing 212, contains the leaf spring 220 and the rotary turret 230.

The rotary turret 230 comprises a disk section 231, and a cylindrical section 232 extending from the center of the disk section 231. The cylindrical section 232 is rotatably mounted on a center shaft 215, which is screwed to the center of the upper housing 211. Four male dovetails 234 are fixed on the lower surface of the disk section 231 by screws 235 at intervals of 90 degrees, and respectively provided with optical elements 261 to 264 each having a dovetail groove. The disk section 231 is provided with an opening 231a to be aligned to the optical elements 261 to 264. When the optical elements 261 to 264 are mounted, an opening 211a, the opening 231a and an opening 212a form an optical path L1.

On the outer peripheral surface of the disk section 231, steel balls 236 are mounted at intervals of 90 degrees corresponding to the optical elements 261 to 264. The disk section 231 is also provided with a ring-shaped groove 237 on its upper side. Furthermore, cutouts 238 and 239, which have the same depth as the ring-shaped groove 237, are formed for 90 degrees on the inner peripheral side of the ring-shaped groove 237, corresponding to the optical elements 261 and 263.

The leaf spring 220 has an L-shaped cross section, a horizontal section 221 fixed on the upper housing 211 by a screw 222, and a vertical section 223 engaged with the steel ball 236 corresponding to the optical element placed in the optical path L1 (the optical element 261 in FIG. 6). According to this configuration, any one of the optical elements 261 to 264 is reliably placed into the optical path L1.

A leading section 144a of a hanging section 144 of the control switch 140 reaches inside of the ring-shaped groove 237 of the disk section 231.

When the control switch 140 is moved in the direction of the arrow c on an axis L4 which passes through the center shaft 215, a steel ball 149 can be engaged with a V-groove 146 or 147. Therefore, it is possible to position the control switch 140 at two points and to place the hanging section 144 into the ring-shaped groove 237 and the cutout 238 (239). The disk section 231, the control switch 140, the steel ball 149 and a spring 148 constitute a restricting mechanism.

The operation of the optical element switching device having the above structure will be described below with reference to FIG. 6.

When the control lever 140 is pushed in, since the hanging section 144 reaches a position shown by the dotted line, it can move through an angle of 90 degrees within the cutout 239, whereby the two optical elements 261 and 262 can be placed into the optical path L1. On the other hand, when the control lever 140 is pulled out, since the hanging section 144 moves to the position shown by the solid line, it can move along the entire ring-shaped groove 237, which makes it possible to insert any one of the four optical elements 261 to 264 into the optical path L1.

According to the third embodiment, similar advantages to those of the first and second embodiments can be obtained. Moreover, since the restricting mechanism can require fewer components than in the aforesaid embodiments, it is possible to reduce failure, to achieve reliable operation, and to reduce the production cost.

Figure 8:
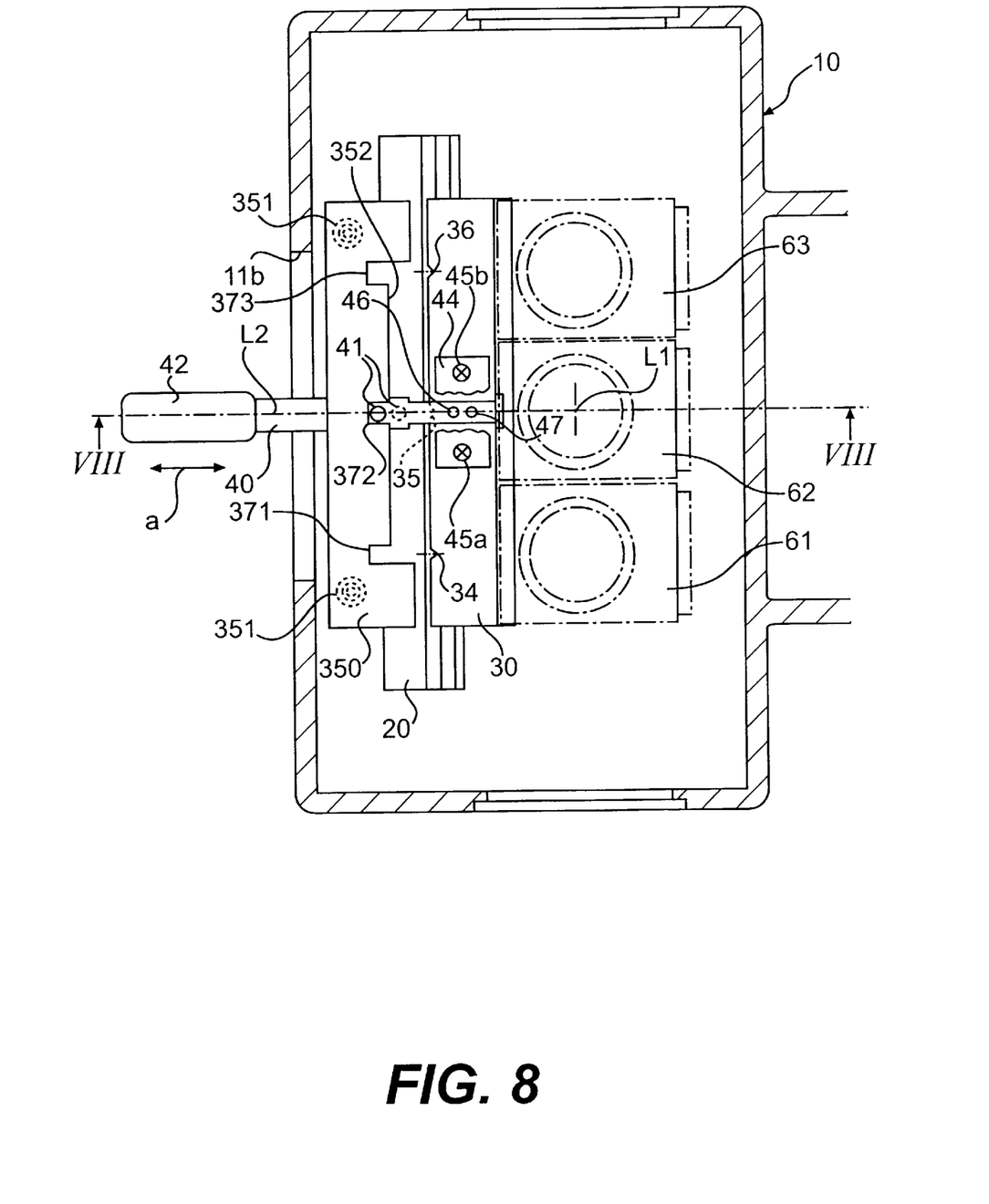
FIG. 8 is a transverse sectional view of an optical element switching device according to a fourth embodiment of the present invention.
Figure 9:
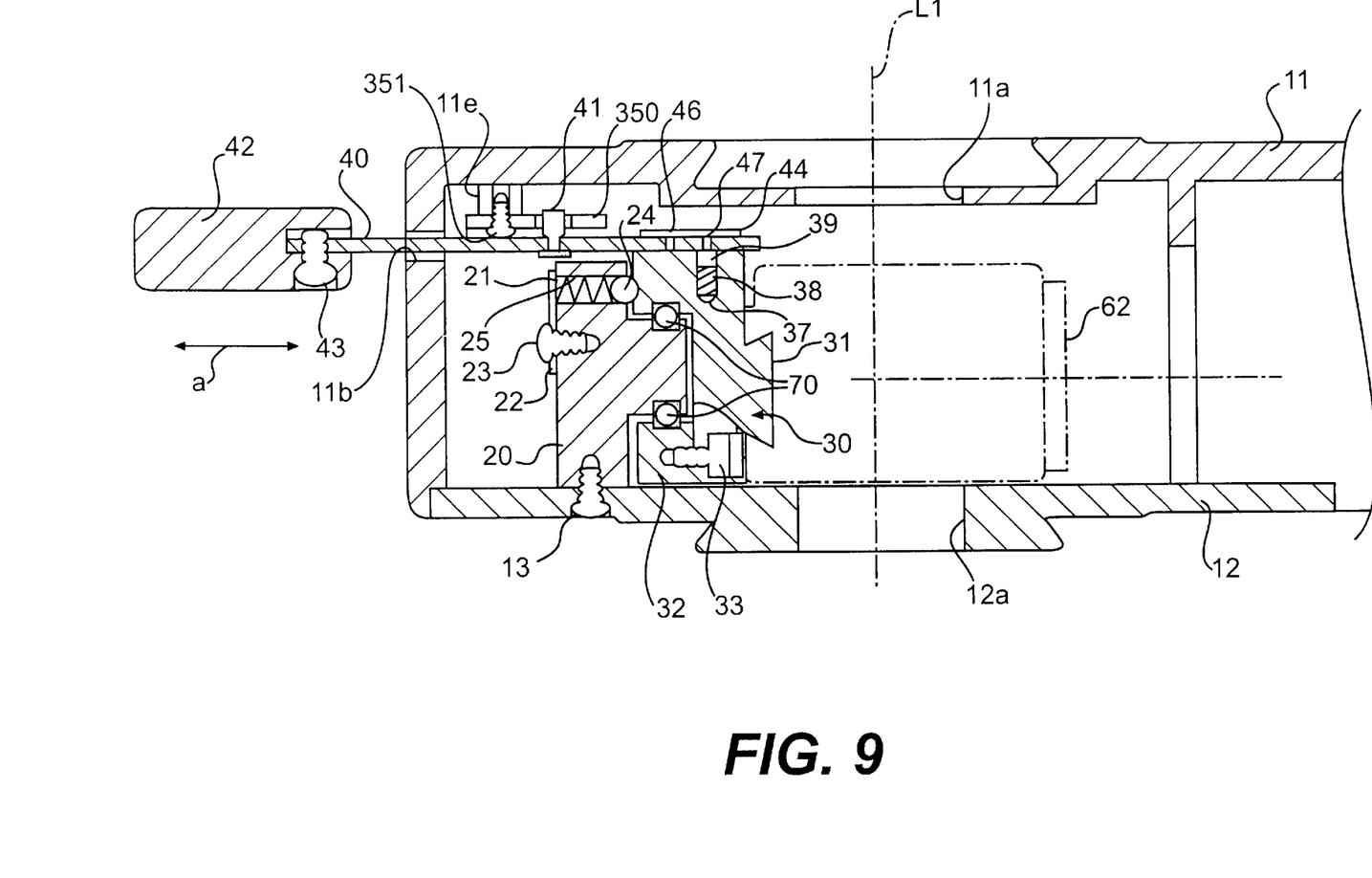
FIG. 9 is a cross-sectional view taken along the line VIII—VIII of FIG. 8.

FIG. 8 is a transverse sectional view of an optical element switching device according to a fourth embodiment of the present invention, and FIG. 9 is a sectional view taken along the line VIII—VIII in FIG. 8. The same components as in the first embodiment are designated by the same numerals, and the description thereof is omitted.

The optical element switching device comprises a housing 10, a fixed guide section 20, a movable guide section 30, a control lever (control section) 40, and a restricting plate (restricting member) 350. The difference between the fourth embodiment and the first embodiment is in the plane shape of the restricting plate. The restricting plate 350 in the fourth embodiment, as illustrated in FIGS. 8 and 9, is fixed to a projecting section 11e of an upper housing 11 by screws 351, and is provided with a rectangular cutout 352 which has a length corresponding to the center distance between optical elements 61 and 63.

Furthermore, the cutout 352 is provided with rectangular cutouts 371 to 373 which are spaced at a distance corresponding to the center distances between the optical elements 61 to 63, and each cutout has a little more width than the diameter of a restricting pin 41.

The optical element switching device having the above structure operates as follows.

When the control lever 40 is pushed in and a steel ball 39 is fitted into a small hole 46, the restricting pin 41 reaches the position shown by the dotted line, which allows the movable guide section 30 to move within the cutout 352.

Consequently, it is possible to fit a steel ball 24 in any one of V-grooves 34 to 36 of the movable guide section 30, and to place any of the three optical elements 61 to 63 into the optical path L1. For example, when the restricting pin 41 and the cutout 372 are aligned, the control lever 40 is pulled out, as shown in FIG. 8, and the steel ball 39 is fitted in a small hole 47, the restricting pin 41 is moved from the position shown by the dotted line to the position shown by the solid line. Thus, the restricting pin 41 is held in the cutout 372. Since the movable guide section 30 is not allowed to move, the optical element 62 is held in the optical path L1.

Similarly, when the cutout 371 and the restricting pin 41 are aligned, the optical element 63 is held in the optical path L1 since the restricting pin 41 is put into the cutout 371. When the cutout 373 and the restricting pin 41 are aligned, the optical element 61 is held in the optical path Li since the restricting pin 41 is put into the cutout 373. In other words, it is possible to hold one of the optical elements 61 to 63 in the optical path L1.

According to the fourth embodiment, in a case in which only one optical element 62 is used frequently, erroneous selection of the optical element is prevented since it can be fixed in the optical path L1 by pulling out the control lever 40. For example, it is possible to prevent a specimen from being substantially damaged by switching the optical elements due to an inadvertent operation of the control lever 40. Moreover, since the movement of the movable guide 30 in the lengthwise direction is prohibited by pulling out the control lever 40, it is possible to mount the optical elements 61 to 63 on the movable guide 30 easily.

In the second embodiment, if the restricting plate 150 is provided with a cutout for holding at least one of the optical elements 61 to 63 in the optical path L1 in the same manner as the fourth embodiment, the same advantages as in the fourth embodiment can be obtained. Furthermore, in the third embodiment, if the rotary turret 230 is provided, on its periphery, with a cutout for holding at least one of the optical elements 261 to 264 in the same manner as in the fourth embodiment, the same advantages as the fourth embodiment can be obtained.

Figure 10:
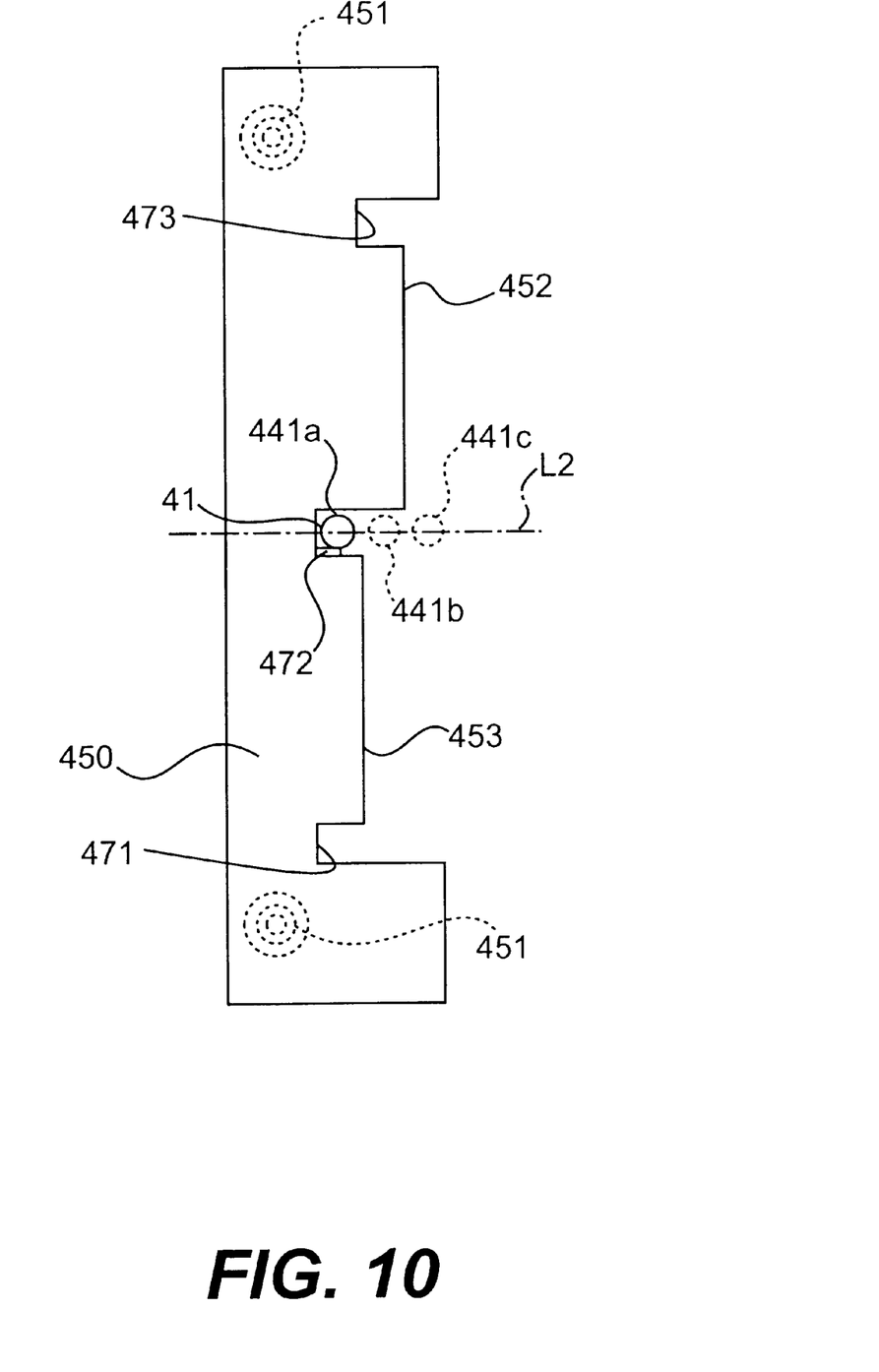
FIG. 10 is a view illustrating a modification of a restricting plate.

FIG. 10 is a view showing a modification of the restricting plate used in the fourth embodiment. The shape of a restricting plate 450 according to this modification is a combination of the shapes of the restricting plates in the first and fourth embodiments. The restricting plate 450 is fixed on an upper housing (not shown) by screws 451, and provided with a rectangular cutout 452 which has a length corresponding to the center distances between optical elements (not shown). The cutout 452 has, in a part thereof, a rectangular cutout 453 which has a length corresponding to the center distance between two adjacent optical elements.

Furthermore, cutouts 471 to 473 are formed at a distance equal to the center distance between the three optical elements.

When the above restricting plate 450 is used instead of the restricting plate 350, the operation of the optical element switching device will be described with reference to FIG. 8. Three small holes for a steel ball 39 are formed on an axis L2 corresponding to three positions 441a, 441b and 441c.

When the control lever 40 is pushed in and the restricting pin 41 is placed into the position 441c, the movable guide section 30 is allowed to move within the cutout 452. Therefore, any one of the V-grooves 34 to 36 of the movable guide section 30 can be engaged with the steel ball 24 by operating the control knob 42, and any one of the three optical elements 61 to 63 can be placed in the optical path L1. At this time, by placing the restricting pin 41 opposed to the cutout 473 into the position 441b by pulling out the control lever 40, the restricting pin 41 is put into the cutout 473, and the optical element 61 is thereby held in the optical path L1.

Furthermore, when the restricting pin 41 located between the position opposed to the cutout 472 and the position opposed to the cutout 471 is placed into the position 441b by pulling out the control lever 40, the movable guide section 30 is allowed to move only within the cutout 453. Accordingly, the movable guide section 30 can be engaged with the steel ball 24 at the V-groove 35 or 36 by operating the control knob 42, and the two optical elements 62 and 63 can be placed in the optical path L1. Additionally, by placing the restricting pin 41 opposed to the cutout 472 into the position 441a by pulling out the control lever 40, the restricting pin 41 is put into the cutout 472, and the optical element 62 is thereby held in the optical path L1. Similarly, when the restricting pin 41 is placed into the position 441a and put into the cutout 471, the optical element 63 is held in the optical path L1.

According to this modification, a combination of the advantages of the first and fourth embodiments can be obtained. The second and fourth embodiments, or the third and fourth embodiments may be combined, and the combination provides the combined advantages of the embodiments in the same manner as in the modification.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical element switching device for an optical equipment having an optical path, the device comprising:

a movable member having a holding section for holding a plurality of optical elements, said movable member being adjustable to place one optical element among the plurality of optical elements in the optical path;

a fixed member having a mounting section for movably holding said movable member; and a restricting device for controlling the movable member for operation in one mode enabling said movable member to place any one of the plurality of optical elements in the optical path and in another mode restricting a moving range of said movable member to limit a number of the plurality of optical elements to be placed in the optical path, wherein said restricting device includes a restricting pin and a restricting member, said restricting pin being mounted on one of said movable member and said fixed member, and said restricting member being mounted on the other of said movable member and said fixed member, said restricting pin and said restricting member being relatively movable along a moving direction of said movable member, said restricting member having at least one cutout for restricting a range of the relative movement, and the moving range of said movable member being restricted by inserting said restricting pin into said cutout, wherein said restricting pin is movable in the direction almost orthogonal to the moving direction of said movable member, and wherein said restricting member has a plurality of said cutouts of different lengths along the moving direction of said restricting pin.

2. An optical element switching device for an optical equipment having an optical path, the device comprising;

a movable member having a holding section for holding a plurality of optical elements, said movable member being adjustable to place one optical element among the plurality of optical elements in the optical path;

a fixed member having a mounting section for movably holding said movable member; and a restricting device for controlling the movable member for operation in one mode enabling said movable member to place any one of the plurality of optical elements in the optical path and in another mode restricting a moving range of said movable member to limit a number of the plurality of optical elements to be placed in the optical path, wherein said restricting device includes a restricting pin and a restricting member, said restricting pin being mounted on one of said movable member and said fixed member, and said restricting member being mounted on the other of said movable member and said fixed member, said restricting pin and said restricting member being relatively movable along a moving direction of said movable member, said restricting member having a cutout for restricting a range of the relative movement, and the moving range of said movable member being restricted by inserting said restricting pin into said cutout, wherein said fixed member has a guide for moving said movable member linearly, wherein said restricting device has an operating member mounted on said movable member movably in the direction orthogonal to said guide so as to move said movable member along said guide, and wherein said restricting pin is mounted on said operating member and inserted into and withdrawn from said cutout in correlation to the movement of said operating member in the direction orthogonal to said guide.

3. An optical element switching device for an optical equipment having an optical path, the device comprising:

a movable member having a holding section for holding a plurality of optical elements, said movable member being adjustable to place one optical element among the plurality of optical elements in the optical path;

a fixed member having a mounting section for movably holding said movable member;

a position setting device for setting the movable member at a position corresponding to each one of the plurality of optical elements to place said one of the plurality of optical elements in the optical path; and a restricting device for locking the movable member in the position to keep said one optical element in the optical path after said position setting device places said one optical element in the optical path.

4. An optical element switching device for an optical equipment having an optical path, the device comprising:

a movable member having a holding section for holding a plurality of optical elements, said movable member being adjustable to place one optical element among the plurality of optical elements in the optical path;

a fixed member having a mounting section for movably holding said movable member;

a position setting device for positioning the movable member with rest to the fixed member such that one of the plurality of optical elements is placed in the optical path; and a restricting device for controlling the movable member for operation in one mode enabling said movable member to place any one of the plurality of optical elements in the optical path and in another mode restricting a moving range of said movable member to limit a number of the plurality of optical elements to be placed in the optical path, wherein said restricting device includes a restricting pin and a restricting member, said restricting pin being mounted on one of said movable member and said fixed member, and said restricting member being mounted on the other of said movable member and said fixed member, said restricting pin and said restricting member being relatively movable along a moving direction of said movable member, said restricting member having at least one cutout for restricting a range of the relative movement, and the moving range of said movable member being restricted by inserting said restricting pin into said cutout.

* * * * *

UNITED STATES PATENT AND TRADEMARK OFFICE
CERTIFICATE OF CORRECTION

PATENT NO. : 6,222,671 B1
DATED : April 24, 2001
INVENTOR(S) : Yasushi Ogihara

It is certified that error appears in the above-identified patent and that said Letters Patent is hereby corrected as shown below:

Claim 4, column 10,
Line 41, "rest" should read -- respect --.

Signed and Sealed this

Thirtieth Day of October, 2001

Attest:

NICHOLAS P. GODICI
Attesting Officer
Acting Director of the United States Patent and Trademark Office